United States Patent
Hoffine et al.

(10) Patent No.: US 8,260,659 B1
(45) Date of Patent: Sep. 4, 2012

(54) WORKLOAD MANAGEMENT FOR PRINTING AND INSERTING MAIL

(75) Inventors: Michelle R. Hoffine, Olathe, KS (US); Penny M. Rogers, Lee's Summit, MO (US); David R. Smith, Greenwood, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 934 days.

(21) Appl. No.: 12/323,462

(22) Filed: Nov. 25, 2008

(51) Int. Cl.
*G06Q 30/00* (2006.01)
(52) U.S. Cl. .................... 705/8; 705/7; 705/9
(58) Field of Classification Search ............ 705/7, 8, 705/9
See application file for complete search history.

(56) References Cited

U.S. PATENT DOCUMENTS

| | | | |
|---|---|---|---|
| 7,031,929 B1 * | 4/2006 | Button et al. | 705/7.22 |
| 7,916,324 B2 * | 3/2011 | Tanaka | 358/1.15 |
| 7,916,327 B2 * | 3/2011 | Yamaguchi | 358/1.15 |
| 7,973,949 B2 * | 7/2011 | Snyderman et al. | 358/1.13 |

* cited by examiner

*Primary Examiner* — Nga B. Nguyen

(57) ABSTRACT

A system provides workload management for printing and inserting mail. A management component receives data that identifies available machines at multiple sites, identifies a work capacity for each machine, identifies available staff to operate the machines, and identifies an amount of pieces of mail for each cycle in a month. The management component estimates a work completion time for printing and inserting the pieces of mail into enclosures for each cycle based on the data, and compares the work completion time for each cycle to a service level agreement. The management component allocates the pieces of mail for each cycle to the machines and the staff based on the comparison, schedules downtime for the machines and the staff based on the allocation, and outputs the allocation and the downtime to a user interface to enable a management team to take a management action based on the allocation and/or the scheduled downtime.

20 Claims, 5 Drawing Sheets

| Cycle 202 | Total Pieces 204 | Jumbo Pieces 206 | Jumbo Time 208 | Large Pieces 210 | Large Time 212 | Small & Medium Pieces 214 | Small & Medium Time 216 | Print & Delay Time 218 | Predicted Cycle Time 220 | Projected Cycle Time 222 |
|---|---|---|---|---|---|---|---|---|---|---|
| 1 | 601,028 | 447 | 4:24:04 | 59,854 | 25:06:30 | 539,342 | 16:03:50 | 6:00:00 | 31:06:30 | 36:45:56 |
| 2 | 427,611 | 773 | 7:36:40 | 5,629 | 4:04:06 | 420,566 | 13:25:08 | 14:21:41 | 27:46:49 | 24:30:52 |
| 3 | 691,771 | 892 | 8:46:58 | 43,388 | 31:21:32 | 646,028 | 20:36:46 | 6:00:00 | 37:21:32 | 29:05:48 |
| 4 | 667,331 | 737 | 7:15:24 | 34,632 | 18:35:22 | 630,725 | 20:07:28 | 6:00:00 | 26:07:28 | 23:37:00 |
| 5 | 711,158 | 970 | 9:33:03 | 60,303 | 25:17:48 | 648,058 | 20:40:39 | 6:00:00 | 31:17:48 | 28:37:08 |
| 6 | 410,704 | 684 | 6:44:05 | 6,920 | 3:42:52 | 402,350 | 12:50:16 | 6:00:00 | 18:50:16 | 19:31:21 |
| 7 | 661,611 | 833 | 8:12:07 | 47,016 | 25:14:12 | 612,240 | 19:32:05 | 6:00:00 | 31:14:12 | 25:48:32 |
| 8 | 618,724 | 597 | 5:52:41 | 30,550 | 22:04:49 | 586,509 | 18:42:50 | 6:00:00 | 28:04:49 | 20:03:51 |
| 9 | 615,506 | 581 | 5:43:14 | 33,987 | 24:33:52 | 579,927 | 18:30:14 | 6:00:00 | 30:33:52 | 28:38:01 |
| 10 | 535,918 | 657 | 6:28:08 | 22,871 | 16:31:49 | 511,438 | 16:19:07 | 6:00:00 | 22:31:49 | 21:26:01 |
| 11 | 544,142 | 793 | 7:48:29 | 34,118 | 24:39:32 | 507,931 | 16:12:24 | 6:00:00 | 30:39:32 | 19:59:50 |
| 12 | 605,450 | 772 | 7:36:04 | 20,479 | 14:48:05 | 583,190 | 18:36:28 | 6:22:52 | 24:59:20 | 19:31:18 |
| 13 | 601,986 | 815 | 8:01:29 | 35,671 | 25:46:53 | 564,163 | 18:00:03 | 6:00:00 | 31:46:53 | 20:33:28 |
| 15 | 599,709 | 1,335 | 13:08:41 | 37,563 | 20:09:45 | 559,296 | 17:50:44 | 6:00:00 | 26:09:45 | 26:09:45 |
| 17 | 695,807 | 814 | 8:00:53 | 50,065 | 26:52:24 | 643,379 | 20:31:42 | 6:00:00 | 32:52:24 | 32:52:24 |
| 18 | 627,408 | 709 | 6:58:51 | 28,908 | 15:31:01 | 596,640 | 19:02:13 | 6:00:00 | 25:02:13 | 25:02:13 |
| 19 | 601,235 | 603 | 5:56:14 | 32,176 | 17:16:16 | 567,480 | 18:06:24 | 6:00:00 | 24:06:24 | 24:06:24 |
| 20 | 563,225 | 327 | 3:13:11 | 5,482 | 2:56:33 | 557,004 | 17:46:20 | 20:06:24 | 37:52:44 | 37:52:44 |
| 21 | 610,050 | 808 | 7:57:20 | 34,878 | 18:43:17 | 573,079 | 18:17:07 | 12:22:44 | 31:06:01 | 31:06:01 |
| 22 | 584,430 | 630 | 6:12:15 | 27,898 | 14:58:29 | 554,927 | 17:42:22 | 11:06:01 | 28:48:23 | 28:48:23 |
| 23 | 647,046 | 924 | 9:05:37 | 43,979 | 23:36:24 | 600,740 | 19:48:04 | 6:00:00 | 29:36:24 | 29:36:24 |
| 24 | 601,803 | 612 | 6:01:38 | 21,383 | 11:28:39 | 578,967 | 18:28:23 | 26:06:24 | 44:34:47 | 44:34:47 |
| 25 | 614,898 | 643 | 6:19:56 | 34,331 | 18:25:39 | 578,815 | 18:28:06 | 20:04:47 | 38:32:53 | 38:32:53 |
| 26 | 610,609 | 995 | 9:47:58 | 34,038 | 18:16:13 | 574,199 | 18:19:16 | 16:32:53 | 34:52:08 | 34:52:08 |
| 27 | 576,327 | 843 | 8:17:58 | 29,395 | 15:46:42 | 544,956 | 17:23:17 | 10:52:08 | 28:15:25 | 28:15:25 |
| 28 | 709,994 | 275 | 2:42:25 | 42,821 | 22:59:06 | 666,098 | 21:15:12 | 6:00:00 | 28:59:06 | 28:59:06 |
| Average | | | 7:13:17 | | 18:48:00 | | 18:10:38 | 9:19:04 | 30:16:30 | 28:02:13 |

| Cycle 302 | Total Small 304 | 1st Site Small 306 | 2nd Site Small 308 | 2nd Site Medium 310 | Total Large 312 | 1st Site Large 314 | 2nd Site Large 316 | Total Jumbo 318 | 1st Site Jumbo 320 | 2nd Site Jumbo 322 |
|---|---|---|---|---|---|---|---|---|---|---|
| 1 | 450,782 | 369,641 | 81,141 | 88,560 | 59,854 | 26,336 | 33,518 | 447 | 224 | 224 |
| 2 | 413,125 | 268,531 | 144,594 | 7,441 | 5,629 | CE flats | residue | 773 | 423 | 350 |
| 3 | 585,036 | 444,627 | 140,409 | 60,992 | 43,388 | 17,789 | 25,599 | 892 | 446 | 446 |
| 4 | 580,476 | 417,943 | 162,533 | 50,249 | 34,632 | 13,160 | 21,472 | 737 | 387 | 350 |
| 5 | 565,608 | 463,799 | 101,809 | 82,450 | 60,303 | 26,533 | 33,770 | 970 | 485 | 485 |
| 6 | 392,651 | 255,223 | 137,428 | 9,699 | 6,920 | CE flats | residue | 684 | 342 | 342 |
| 7 | 548,021 | 416,496 | 131,525 | 64,219 | 47,016 | 19,277 | 27,739 | 833 | 417 | 417 |
| 8 | 542,013 | 411,930 | 130,083 | 44,496 | 30,550 | 11,609 | 18,941 | 597 | 299 | 299 |
| 9 | 531,630 | 404,039 | 127,591 | 48,297 | 33,987 | 12,915 | 21,072 | 581 | 291 | 291 |
| 10 | 479,241 | 330,676 | 148,565 | 32,197 | 22,871 | 10,000 | 12,871 | 657 | 329 | 329 |
| 11 | 462,967 | 351,855 | 111,112 | 44,964 | 34,118 | 12,965 | 21,153 | 793 | 443 | 350 |
| 12 | 552,372 | 381,137 | 171,235 | 30,818 | 20,479 | 10,000 | 10,479 | 772 | 422 | 350 |
| 13 | 516,126 | 392,256 | 123,870 | 48,037 | 35,671 | 13,555 | 22,116 | 815 | 408 | 408 |
| 15 | 508,218 | 365,917 | 142,301 | 51,078 | 37,563 | 14,274 | 23,289 | 1,335 | 668 | 668 |
| 17 | 578,467 | 439,635 | 138,832 | 64,912 | 50,065 | 20,527 | 29,538 | 814 | 407 | 407 |
| 18 | 555,373 | 383,207 | 172,166 | 41,267 | 28,908 | 10,000 | 18,908 | 709 | 355 | 355 |
| 19 | 520,774 | 395,788 | 124,986 | 46,706 | 32,176 | 12,227 | 19,949 | 603 | 302 | 302 |
| 20 | 548,288 | 356,387 | 191,901 | 8,716 | 5,482 | CE flats | residue | 327 | 164 | 164 |
| 21 | 524,967 | 398,975 | 125,992 | 48,112 | 34,878 | 13,254 | 21,624 | 808 | 458 | 350 |
| 22 | 516,394 | 356,312 | 160,082 | 38,533 | 27,898 | 10,000 | 17,898 | 630 | 315 | 315 |
| 23 | 540,372 | 410,683 | 129,689 | 60,368 | 43,979 | 18,031 | 25,948 | 924 | 462 | 462 |
| 24 | 549,073 | 378,860 | 170,213 | 29,894 | 21,383 | 10,000 | 11,383 | 612 | 306 | 306 |
| 25 | 530,981 | 403,545 | 127,435 | 47,834 | 34,331 | 13,046 | 21,285 | 643 | 322 | 322 |
| 26 | 527,906 | 401,208 | 126,697 | 46,294 | 34,038 | 12,934 | 21,103 | 995 | 498 | 498 |
| 27 | 504,272 | 347,948 | 156,324 | 40,685 | 29,395 | 11,170 | 18,225 | 843 | 421 | 421 |
| 28 | 608,016 | 462,092 | 145,924 | 58,082 | 42,821 | 17,557 | 25,264 | 275 | 137 | 137 |

324

Volumes 326

| Medium 328 | % of Small Total | | |
|---|---|---|---|
| | 1st Site | 2nd Site | |
| 0-21K | 65% | 35% | |
| 22K-41K | 69% | 31% | |
| 42K-57K | 72% | 28% | |
| 58K-68K | 76% | 24% | |
| 69K-79K | 78% | 22% | |
| 80k-89K | 82% | 18% | |
| 90k-100K | 87% | 13% | |

| Large 330 | 1st Site | 2nd Site |
|---|---|---|
| 0k-28k | 10,000 | residue |
| 29k-41k | 38% | 62% |
| 42K-58K | 41% | 59% |
| 59k+ | 44% | 56% |

| Jumbo 332 | 1st Site | 2nd Site |
|---|---|---|
| 0-700 | 350 | 350 |
| 701-800 | 450 | 350 |
| 801+ | 50% | 50% |

Fig. 3

WORKLOAD MANAGEMENT FOR PRINTING AND INSERTING MAIL

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Enterprises may complete cycles of work on a periodic basis. For example, a bank or a credit card company may send million of pieces of mail to customers each month by sending mail nearly every day of each month. An internal or external printing organization may manage the work of printing the pieces of mail and inserting the pieces of mail into enclosures to be mailed to customers on an almost daily basis. If the organization's printing machines or inserting machines either break down or require maintenance, the work completion may be delayed, which may prevent the organization from meeting contractual deadlines. If the completion of one day's work is delayed until the next day, the delay may cause a ripple of additional delays for subsequent days' work.

SUMMARY

In some embodiments, a system is provided for workload management for printing and inserting mail. The system includes a user interface, a processor, and a management component. The management component, when executed by the processor, receives data that identifies available machines at a plurality of sites, identifies a work capacity for each of the available machines, identifies available staff to operate the available machines, and identifies an amount of pieces of mail for each of a plurality of cycles in a month. The management component also estimates a work completion time for printing the pieces of mail and inserting the pieces of mail into enclosures for each of the plurality of cycles based on the data, and compares the estimated work completion time for each of the plurality of cycles to a service level agreement. Additionally, the management component allocates the pieces of mail for each of the plurality of cycles to the available machines and the available staff at the plurality of sites based on the comparison, and schedules downtime for the available machines and the available staff based on the allocation. Furthermore, the management component outputs the allocation and the scheduled downtime to the user interface to enable a management team to take a management action based on at least one of the allocation and the scheduled downtime.

In some embodiments, a method is provided for workload management for printing and inserting mail. Data is received that identifies available machines at a plurality of sites, identifies a work capacity for each of the available machines, identifies available staff to operate the available machines, and identifies an amount of pieces of mail for each of a plurality of cycles in a month. A work completion time is estimated for printing the pieces of mail and inserting the pieces of mail into enclosures for each of the plurality of cycles based on the data. The estimated work completion time for each of the plurality of cycles is compared to a service level agreement. The pieces of mail are allocated for each of the plurality of cycles to the available machines and the available staff at the plurality of sites based on the comparison. A proposed change in at least one of a number of the available machines and a number of the available staff is evaluated based on the allocation. The allocation and the evaluation are output to a user interface to enable a management team to take a management action based on at least one of the allocation and the evaluation.

In some embodiments, a system is provided for workload management for printing and inserting mail. The system includes a user interface, a processor, and a management component. The management component, when executed by the processor, receives data that identifies available machines at a plurality of sites, identifies a work capacity for each of the available machines, identifies available staff to operate the available machines, identifies an amount of pieces of mail for each of a plurality of cycles in a month, and estimates a cost associated with at least one of each of the available machines, each of the available staff, and the amount of work. The management component also estimates a work completion time for printing the pieces of mail and inserting the pieces of mail for each of the plurality of cycles based on the data, and compares the estimated work completion time for each of the plurality of cycles to a service level agreement. Additionally, the management component allocates the pieces of mail for each of the plurality of cycles to the available machines and the available staff at the plurality of sites based on the comparison and the cost associated with at least one of each of the available machines, each of the available staff, and the amount of work. Furthermore, the management component outputs the allocation to the user interface to enable a management team to take a management action based on the allocation.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 2 is a table for workload management for printing and inserting mail according to some embodiments of the present disclosure.

FIG. 3 is another table for workload management for printing and inserting mail according to some embodiments of the present disclosure.

DETAILED DESCRIPTION

Figure 1:
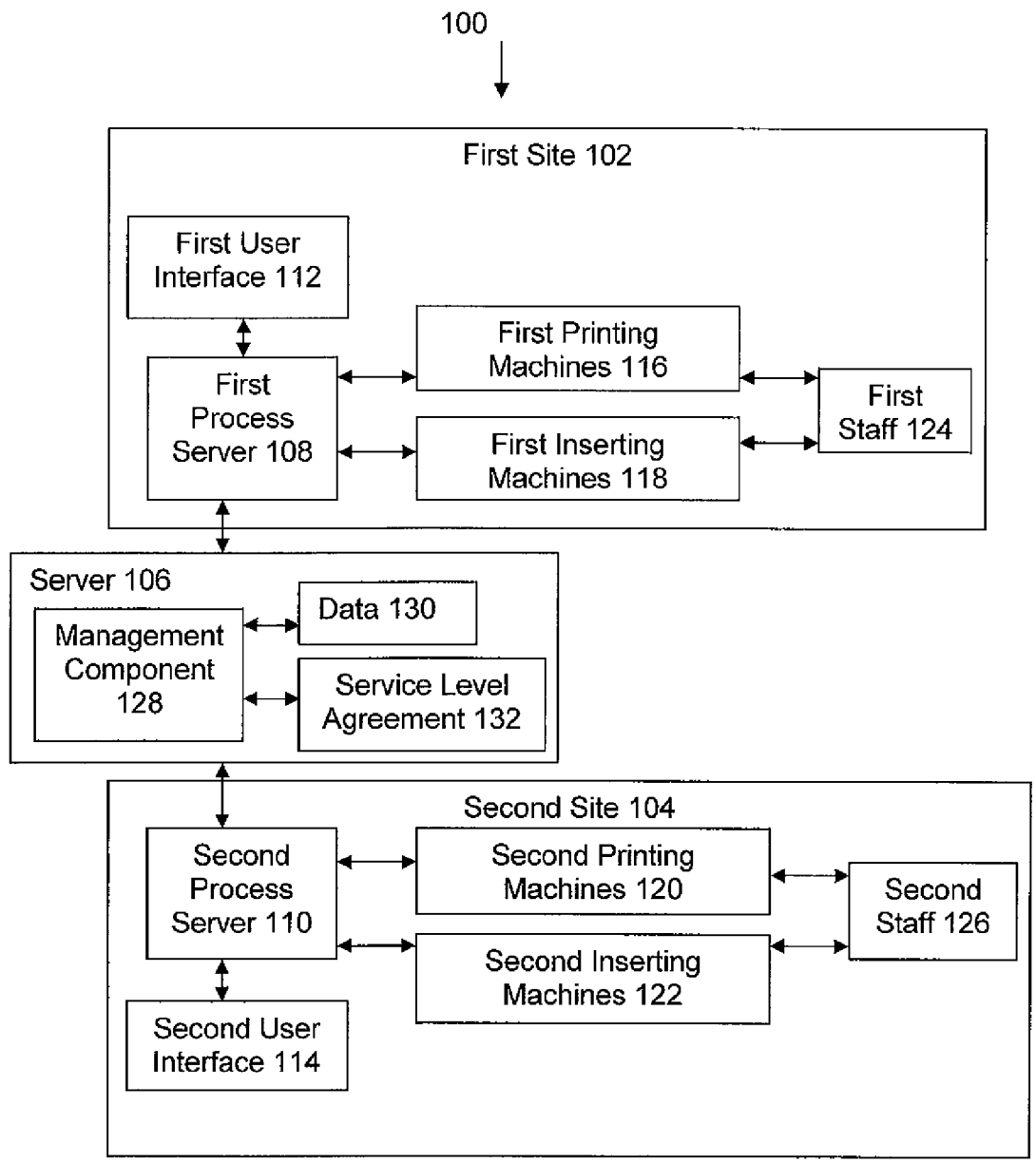
FIG. 1 illustrates a system for workload management for printing and inserting mail according to some embodiments of the present disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

An enterprise may divide its workload between different worksites, such as when a bank uses a first work site to print and insert small size pieces of mail and uses a second work site to print and insert large size pieces of mail. An invoice of less than 15 pages may be a small size piece of mail, while an invoice of more than 15 pages may be a large size piece of mail. Management teams at each site may have to guess at how much work each site can process on any day and speculate whether or not each site can meet each of its deadlines. Although the first site may print and insert all of Monday's small size invoices by the end of Monday, the second site may experience delays that result in printing and/or inserting some of Monday's large size invoices on Tuesday. One missed deadline may result in a ripple effect of missed deadlines, such as when the need to complete some of Monday's work on Tuesday does not leave enough time to complete all of Tuesday's work on Tuesday, thereby creating another missed deadline. Missed deadlines may result in lower customer satisfaction and/or contractual penalties. Additionally, missed deadlines may lead to lost revenue, as delays in sending invoices may lead to delays in customer payments, thereby incurring a time-value-of-money penalty. To avoid missed deadlines, the enterprise may need to allocate overtime pay to some of the staff at a site to complete the unfinished work for a day, thereby increasing operating expenses.

The enterprise may instruct the first site that finished its Monday work early to not start any of its Tuesday work on Monday because of the potential need to assist the second site with unfinished work. This potential redistribution of work between sites may cause waste. For example, by the time a management team at the second site realizes late on Monday that not enough time remains to insert all of Monday's large size invoices into enclosures, the second site has probably already printed all of Monday's large size invoices. The second site may send an electronic file of the large size invoices to the first site and the first site may have the machines and staff to print and insert the large size invoices. However, each of the large size invoices that the first site eventually prints and inserts probably already has been printed by the second site. Because the large size invoices printed at the second site may be thrown away, the time and expenses spent on printing these large size invoices at the second site has been wasted. The second site may not have enough time to send the previously printed large size invoices to the first site, or the cost of sending these large size invoices may be more expensive than the overtime pay required for the second site staff to complete Monday's work.

In some embodiments, a system is provided for workload management for printing and inserting mail. A management component receives monthly workflow management data from user interfaces and/or software applications. The data identifies the available machines at each site, identifies a work capacity for each of the available machines, identifies available staff to operate the available machines, and identifies an amount of pieces of mail for each of multiple work cycles in a month. The management component estimates a work completion time for printing the pieces of mail and inserting the pieces of mail into enclosures for each cycle based on the previous month's data. For example, the data indicates 360,000 small size invoices were inserted during last month's $6^{th}$ work cycle, and 10 staff are initially allocated for this month's $6^{th}$ cycle to operate 10 small size invoice inserters with a throughput of 3,000 small size invoices per hour for each inserter. Therefore, the management component divides the estimated 360,000 small size invoices for this month's $6^{th}$ work cycle by the estimated capacity of 30,000 small size invoices per hour to produce an estimated small size invoice insertion time of 12 hours for this month's $6^{th}$ work cycle. If the printing time for the invoices is estimated at 6 hours for the $6^{th}$ cycle, and the small size invoice insertion time is the longest type of insertion time for the $6^{th}$ cycle, then the work completion time may be estimated at 18 hours for the $6^{th}$ cycle. The invoice insertion time may begin after the completion of the printing time or overlap with part of the printing time.

The management component may allocate the pieces of mail for each cycle to the available machines and the available staff based on a comparison of the estimated work completion times to the work completion times specified in a service level agreement. For example, the average estimated completion time for the next month may be greater than the average monthly completion time specified in the service level agreement. The estimated completion time for the $25^{th}$ cycle may be the longest estimated cycle completion time for the next month and may be based on the estimated time to insert the small size invoices during the $25^{th}$ cycle of the next month. In some situations, the management component may allocate pieces of mail in a manner that results in a long individual cycle completion time if the long individual cycle completion time enables previous and subsequent cycles to complete in less time, thereby lowering the average monthly completion time. The management component may respond to a high monthly average by rescheduling the preventative maintenance for one of the small size invoice inserters at the second site from the $25^{th}$ cycle to the $23^{rd}$ cycle when more time is available to insert the small size invoices, when the work completion time for the cycle is not based on the small size invoice insertion time. The management component also may distribute the work previously allocated for the small invoice inserter assigned for preventative maintenance during the $23^{rd}$ cycle to the other small invoice inserters at the first and second sites. The management component outputs the allocation of work and the scheduled downtime to the user interface to enable a management team to decide on a recommended management action, such as approving or revising the rescheduled preventative maintenance.

Furthermore, the management component may evaluate a proposed change in the number of the available machines and/or the number of the available staff. For example, the management component may allocate an additional staff member to assist an initially allocated staff member to operate a large size invoice inserter more efficiently during the $3^{rd}$ cycle. Based on this allocation, the management component may estimate the new work completion times for the $3^{rd}$ cycle, and compare the new work completion times for the $3^{rd}$ cycle to a work completion time specified in the service level agreement. This new comparison may indicate how many penalties may be avoided and/or how many bonuses may be earned based on the proposed allocation of the additional staff member to assist in operating a large size invoice inserter more efficiently. The management component outputs the proposed reallocation of the work to the user interface to enable a management team to evaluate a recommended management action, such as the approval of the additional staff member for the $3^{rd}$ cycle.

The data received by the management component may also identify costs for operating and maintaining the available machines, paying the available staff, mailing invoices, and processing the allocated pieces of mail. Therefore, the management component may also allocate the pieces of mail for each cycle to the available machines and the available staff at the sites based on the estimated costs. For example, the management component may estimate the overtime pay and the possible electricity costs required for an additional staff member to assist an initially allocated staff member to operate a large size invoice printer more efficiently during the $3^{rd}$ cycle. These estimated costs may be less than the penalty that could be incurred due to the estimated work completion time for the $3^{rd}$ cycle exceeding the maximum cycle work completion time specified by the service level agreement. The management component outputs the allocation and the estimated costs to the user interface to enable a management team to approve a recommended management action, such as the allocation of an additional staff during the $3^{rd}$ cycle.

The management component applies next month's initial allocation of staff and machines to last month's work capacities and the work loads for last month's cycles to estimate the work completion times for each type of work during each of next month's cycles. The management component enables management teams to evaluate the effects of proposed reallocations of staff and machines, and any associated costs incurred and expenses saved. The management component provides work completion times based on initial allocations and proposed reallocations, which management teams may use to make more informed management decisions regarding the purchasing and decommissioning of machines, the hiring and laying off of staff, and the scheduling of preventative maintenance, staff meetings, and vacations.

FIG. 1 illustrates a system 100 for workload management for printing and inserting mail according to some embodiments of the present disclosure. The system 100 includes a first site 102, a second site 104, a server 106, a first process server 108, a second process server 110, a first user interface 112, a second user interface 114, first machines 116-118, second machines 120-122, first staff 124, and second staff 126. The first process server 108, the first user interface 112, the first machines 116-118, and the first staff 124 are located at the first site 102, while the second process server 110, the second user interface 114, the second machines 120-122, and the second staff 126 are located at the second site 104. The numbers of each type of component in the system 100 are depicted in FIG. 1 for the purpose of an illustrative example, as the system 100 can include any number of each component type.

The sites 102-104 may be geographically close to each other or located far from each other, even in different time zones. The server 106 may send information, such as files of work, to the process servers 108-110 at the sites 102-104. The server 106 may receive the information from other user interfaces or software components, such as billing applications. Management teams at the sites 102-104 may review the work files in the process servers 108-110 via the user interfaces 112-114. After review by the management teams, the process servers 108-110 may convey the information received from the server 106 and information input from the user interfaces 112-114 as work assignments to the machines 116-122 that are operated by the staff 124-126. The staff 124-126 may use the information to complete the work assignments using the machines 116-122. Some of the staff 124-126 may be trained to operate some of the types of machines 116-122, but may not be trained to operate all of the types of machines 116-122. Although the machines 116-122 are depicted in FIG. 1 as first printing machines 116 and first inserting machines 118 located at the first site 102, and second printing machines 120 and second inserting machines 122 located at the second site 104, embodiments of the present disclosure may be applied as workload management for other types of machines. Additionally, although the present disclosures uses invoices as an example of pieces of work that are printed and inserted into disclosures, the system 100 may also apply to printing and inserting advertisements and periodicals, such as magazines and newspapers.

The server 106 includes a management component 128, and may include data 130 and a service level agreement 132. Although depicted as located in the server 106 in FIG. 1, the data 130 and the service level agreement 132 may also be located separate from the server 106. The management component 128 may receive workflow management data from user interfaces, such as the user interfaces 112-114, and/or software applications. The data may identify the machines 116-122 that are available at each of the sites 102-104, identify a work capacity for each of the machines 116-122 that are available, identify staff 124-126 that are available to operate the machines 116-122 that are available, and identify an amount of pieces of mail for each work cycle in a month. The data may also identify costs associated with the machines 116-122 that are available, the staff 124-126 that are available, mailing invoices, and the estimated amount of pieces of mail.

For example, the data indicates that 6 of the first staff 124 are available to operate 6 of the first printing machines 116 and 6 of the first inserting machines 118 at the first site 102, while 4 of the second staff 126 are available to operate 4 of the second printing machines 120 and 4 of the second inserting machines 122 at the second site 104. The data further indicates that the 402, 350 small size invoices were processed during the $6^{th}$ work cycle last month, and that 10 of the inserting machines 118 and 122 that are available during the $6^{th}$ cycle of this month have the estimated capacity to insert 752, 185 small invoices in a 24 hour period when operated by 10 of the staff 124-126.

The work capacity for each of the machines 116-122 that are available may be based on an average of a predetermined number of greatest throughput cycles for each of the machines 116-122 that are available. For example, the work capacity for 6 of the small size invoice inserting machines at the first site 102 may be evaluated collectively, such as identifying the ten highest cycle rates of inserting small size invoices by the total of the 6 small size invoice inserting machines during the last month, and then averaging the highest cycle rates to produce an estimated work capacity for the 6 small size invoice inserting machines. The management component 128 may use the ten highest cycle rates to more accurately estimate work capacities because the other cycle rates may occur during cycles when less work is processed, which may result in calculating cycle rates partially based on significant amounts of semi-idle time, cycle rates that do not reflect the actual full work capacities of the first inserting machines 118.

In another example, the work capacity for 6 of the small size invoice inserting machines at the first site 102 may be evaluated individually, such as calculating the average of the ten highest cycle rates of inserting small size invoices by each of the 6 small size invoice inserting machines during the last month, and then summing the 6 averages to produce an estimated work capacity for the 6 small size invoice inserting machines. Evaluating the first inserting machines 118 individually may require more detailed tracking of data for each specific machine, but may also produce even more accurate estimates of work capacity due to the differences in work capacities for specific machines and the efficiencies of the staff that operate the specific machines.

The management component 128 estimates a work completion time for each cycle based on the data. For example, dividing the 402,350 small size invoices processed during last month's 6$^{th}$ work cycle by the estimated capacity of inserting 752,185 small size invoices in a 24 hour period results in an estimated small size invoice insertion time of 13 hours, 25 minutes, and 8 seconds for this month's 6$^{th}$ work cycle. If this estimated time is the longest processing time for any type of invoice insertion, and the printing time for all of the invoices is estimated at 6 hours, then the work completion time for the 6$^{th}$ cycle is estimated at 19 hours, 25 minutes, and 8 seconds. The management component 128 may compare the work completion time for each individual cycle and/or the average work completion time for all of the cycles to completion times specified in the service level agreement 132. For example, the comparison may indicate that the average completion time for every cycle in the month is less than the monthly average specified in the service level agreement 132, and that the completion time for 22 of the 26 individual cycles is less than a cycle average specified in the service level agreement 132.

The management component 128 may allocate the work for each cycle to the machines 116-122 that are available and the staff 124-126 that are available based on the comparison of the estimated work completion times to the work completion times specified in the service level agreement 132. For example, the estimated completion time for the 25$^{th}$ cycle may be based on the estimated time to insert the small size invoices and may be greater than the maximum cycle completion time specified in the service level agreement 132. The management component 128 may respond by rescheduling the preventative maintenance for one of the second inserting machines 122, a small size invoice inserter at the second site 104, from the 25$^{th}$ cycle to the 23$^{rd}$ cycle. In the 23$^{rd}$ cycle, the estimated work completion time is based on the estimated time to insert the large size invoices instead of the estimated time to insert the small size invoices. The management component 128 may also distribute the work previously allocated for the small invoice inserter assigned for preventative maintenance during the 23$^{rd}$ cycle to the other second inserting machines 122, three other small invoice inserters at the second site 104, and the first inserting machines 118, six small invoice inserters at the first site 102, that are scheduled to be available during the 23$^{rd}$ cycle. The management component 128 outputs the allocation of work and the scheduled downtime to the user interfaces 112-114 via the process servers 108-110 to enable the management teams at the sites 102-104 to decide on a recommended management action, such as approving or revising the rescheduled preventative maintenance.

Furthermore, the management component 128 may evaluate a proposed change in the number of the machines 116-122 that are available and/or the number of the staff 124-126 that are available. For example, the management team at the second site 104 may be considering the purchase of a new large size invoice inserting machine and the hire of a new staff member to operate the new large size invoice inserting machine, and input data that reflects these possibilities via the second user interface 114. In response, the management component 128 may allocate the work for the next month based on the availability of the new large size invoice inserting machine and the new staff member, estimate the new work completion times for each cycle, and compare the new work completion times to the work completion times specified in the service level agreement 132. This new comparison may indicate how many penalties may be avoided and how many bonuses may be earned based on the addition of the new large size invoice inserting machine and the new staff member. The management component 128 may output the potential reallocation of the work to the second user interface 114 via the second process server 110 to enable the management team at the second site 104 to evaluate a recommended management action, such as the prospective purchase of the new large size invoice inserting machine and the prospective hire of the new staff member.

The data received by the management component 128 may also identify costs for operating and maintaining the machines 116-122 that are available, paying the staff 124-126 that are available, mailing invoices, and processing the allocated pieces of mail. Therefore, the management component 128 may also allocate the work for each cycle to the machines 116-122 that are available and the staff 124-126 that are available at the sites 102-104 based on estimated costs. For example, the additional pay and the additional electricity costs required for paying an additional staff member to operate an additional large size invoice printing machine for the next month may be much less than the penalty incurred due to the estimated work completion time exceeding the maximum average work completion time specified by the service level agreement 132. The management component 128 outputs the allocation and the estimated costs to the user interfaces 112-114 via the process servers 108-110 to enable the management teams at the sites 102-104 to approve a recommended management action, such as hiring an additional staff and purchasing an additional large size invoice inserter.

FIG. 2 shows a table 200 for workload management for printing and inserting mail according to some embodiments of the present disclosure. The table 200 includes a cycle column 202, a total pieces column 204, a jumbo pieces column 206, a jumbo time column 208, a large pieces column 210, a large time column 212, a small and medium pieces column 214, a small and medium time column 216, a print/delay column 218, a predicted cycle time column 220, a projected cycle time column 222, and rows 224 corresponding to the columns 202-222.

The cycle column 202 identifies the work cycle number, which may denote a calendar date number or a sequence in which work files are received from a billing application. The rows 224 in the cycle column 202 do not include a 14$^{th}$ cycle or a 16$^{th}$ cycle in FIG. 2, but the rows 224 could include consecutive integers for cycle numbers in some embodiments. The total pieces column 204 indicates how many pieces of mail are to be processed during a given cycle, such as the total number of invoices to be printed and inserted into enclosures.

The jumbo pieces column 206 and the jumbo time column 208 indicate how many of the total pieces of mail in a cycle are categorized as jumbo pieces, such as invoices of more than 45 pages, and the estimated time required to insert the corresponding number of jumbo pieces into jumbo enclosures. The values listed in the jumbo time column 208 are calculated by dividing the corresponding values in the jumbo pieces column 206 by the estimated throughput capacity for the jumbo invoice size inserters that are scheduled to operate during the corresponding cycle.

The large pieces column 210 and the large time column 212 are similar to the jumbo pieces column 206 and the jumbo time column 208, but applied to the total pieces of mail in a cycle that are categorized as large pieces, such as invoices of 15 to 45 pages. The small and medium pieces column 214 and the small and medium time column 216 are also similar to the jumbo pieces column 206 and the jumbo time column 208, but applied to the total pieces of mail in a cycle that are categorized as small and medium pieces, such as invoices of less than 15 pages. The print/delay column 218 indicates the estimated time required to print the total pieces in a cycle, including any delays involved in setting up the printing machines 116 and 120 and/or the inserting machines 118 and 122. Delays in setting up the machines 116-122 may be due to the work allocated to previous cycles taking longer than estimated, thereby preventing the machines 116-122 from being used for a current cycle's work. The values listed in the print and delay time cycle 220 may be calculated by dividing the corresponding values in the total pieces column 204 by the estimated throughput capacity for the various invoice printers 118 and 122 that are scheduled to operate during the corresponding cycle, and then adding in any delay time required for setting up the machines 116-122. Alternatively, the values in the jumbo pieces column 206, the large pieces column 210, and the small and medium pieces column 214 may be divided by the estimated throughput capacity for the corresponding jumbo size, large size, and small and medium size invoice printers that are scheduled to operate during the corresponding cycle. The management component 128 may track the delay times associated with each of the machines 116-122.

The predicted cycle time column 220 indicates the amount of time estimated to complete the work in a cycle, which may be measured from either the receipt of the work file or the approval to process the work file to the last insertion of a piece specified by the cycle's work file. The work completion times listed in the predicted cycle time column 220 are based on the estimated times listed in the jumbo time column 208, the large time column 212, the small and medium time column 216, and the print and delay column 218. The work of the jumbo pieces, the large pieces, the small pieces, and the medium pieces may begin at the same time for a work cycle. Therefore, the work completion time for a cycle depends on the longest of the estimated insertion times for the jumbo pieces, the large pieces, the small pieces, and the medium pieces in a cycle. The work completion time for any cycle equals the longest insertion time for any of the type of pieces inserted during the cycle added to the print and delay time for the cycle.

For example, the predicted cycle time for the $1^{st}$ cycle equals the print and delay time for the $1^{st}$ cycle added to the estimated time for the large pieces for the $1^{st}$ cycle because the estimated time for the large pieces for the $1^{st}$ cycle is longer than the estimated time for either the jumbo pieces or the small and medium pieces during the $1^{st}$ cycle. In another example, the predicted cycle time for the $2^{nd}$ cycle equals the print and delay time for the $2^{nd}$ cycle added to the estimated time for the small and medium pieces for the $2^{nd}$ cycle because the estimated time for the small and medium pieces for the $2^{nd}$ cycle is longer than the estimated time for either the jumbo pieces or the large pieces during the $2^{nd}$ cycle.

The value listed at the bottom of the predicted cycle time column 220 is an average of 30 hours, 16 minutes and 30 second for the 26 cycles in the month. 26 cycles multiplied by an average of more than 30 hours equals more than 780 hours, which is more than the 744 hours in a 31 day month. However, this cycle average is possible because printing of invoices for the next cycle may begin before inserting of invoices for the current cycle is completed. The advance planning enabled by the management component 128 enables the management teams to overlap cycles by knowing when the sites 102-104 can begin work on the next cycle before the work on the previous cycle is completed.

For example, the estimated time for the large pieces is 6 hours for printing and approximately 4 hours for inserting during the $2^{nd}$ cycle and 6 hours for printing and approximately 31 hours for inserting during the $3^{rd}$ cycle, which add to a total of approximately 47 hours. Meanwhile, the estimated time for the small and medium pieces is 6 hours for printing and approximately 13 hours for inserting during the $2^{nd}$ cycle and 6 hours for printing and approximately 20 hours for inserting during the $3^{rd}$ cycle, which add to a total of approximately 45 hours. In this situation, the $2^{nd}$ and $3^{rd}$ cycles total approximately 47 hours for the large pieces and 45 hours for the small and medium pieces. For this example, none of the large size invoice inserters may have the capability to insert small and medium size invoices, none of the small and medium size invoice inserters may have the capability to insert large size invoices, and some of the small size invoice inserters may not have the capability to insert medium size invoices. Therefore, the management component 128 recommends to start processing the $3^{rd}$ cycle large size invoices as soon as possible after completing the $2^{nd}$ cycle large size invoices in approximately 10 hours, based on 6 hours for printing and approximately 4 hours for inserting. The management component 128 does not recommend delaying the start of the processing for the $3^{rd}$ cycle large size invoices until 19 hours (6 hours for printing and 13 hours for inserting) have lapsed for the $2^{nd}$ cycle for the rest of the $2^{nd}$ cycle work to be completed by the small and medium size invoice inserters. In some situations, starting some of the work for the next cycle in advance may result in completing the next cycle sooner than the next cycle would complete if the staff 124-126 is required to wait for all of the work for the current cycle to complete first.

The projected cycle time column 222 lists a combination of actual cycle completion times and estimated work completion times. For example, FIG. 2. depicts that the values listed in the predicted cycle time column 220 differ from the values listed in the projected cycle time column 222 from the $1^{st}$ cycle to the $13^{th}$ cycle. However, the values are identical for the columns 220-222 from the $15^{th}$ cycle through the $28^{th}$ cycle because table 200 represents data for a month that has completed 13 cycles. Basing the average work completion time for a month on a combination of actual completion times for cycles that have already occurred and estimated work completion times for cycles that have not yet occurred enables the management component 128 to adjust allocations accordingly as a month progresses.

For example, FIG. 2 indicates that the first 13 cycles have produced actual work completion times that have lowered the estimated average for the month from 30 hours, 16 minutes and 30 seconds to 28 hours, 2 minutes, and 13 seconds. Based on this lower average, the management component 128 may allocate work differently than it initially allocated work at the beginning of the month. The management component 128 may have initially recommended adding additional staff and an additional machine during the $24^{th}$ cycle of the month to provide an average 6 hour buffer for unexpected outages because the initial estimated work completion time was within 6 hours of the maximum monthly average of 36 hours specified in the service level agreement 132. However, the management component 128 may react to the average estimated work completion time for the month dropping below 30 hours by recommending that the allocation of the additional staff and the additional machine be cancelled for the $24^{th}$ cycle to save the costs for the additional staff and the additional machine. Similarly, if the average estimated work completion time increases during a month, the management component 128 may recommend more aggressive measures to reduce the estimated completion time for the month's remaining cycles.

The management component 128 may allocate work to the machines 116-122 for each cycle based on an invoice enclosure size, such as a small invoice enclosure, a medium invoice enclosure, a large invoice enclosure, and a jumbo invoice enclosure. Some of the machines 116-122 may be capable of processing each invoice size, such as the printing machines 116 and 120 that can print each invoice size. In contrast, other machines may be capable of processing only one invoice size, such as a small size invoice inserter, which can insert small size invoices, but not medium, large, or jumbo size invoices. Because the number of pages in a customer's invoice may vary from month to month, the enclosure required for the customer's invoice may vary from month to month. For example, if a customer's January invoice was 8 pages, the invoice is mailed in a small enclosure, which is designed to hold from 1 to 8 pages. If the customer's invoice size grows slightly in February to 9 pages, the February invoice is mailed in a medium enclosure, which is designed to hold from 9 to 14 pages. Therefore, the number of each different type of invoice changes from month to month due not only to the addition of new customers and the loss of old customers, but also due to the number of invoice pages changing from one invoice type to another invoice type for many existing customers. Therefore, the management component 128 estimates the numbers of each type of mail for the cycles in a month based on last month's work because such numbers may have historically changed by only a few percentage points from month to month. The management component 128 may also base estimates on reports from customer service representatives that indicate an addition of a large number of new customers in response to a promotion. Likewise, the management component 128 estimates the work capacity for each of the machines 116-122 for a month based on last month's work capacities because such numbers may have historically changed by only a few percentage points from month to month despite more efficient staff taking vacations or unexpected outages for some of the machines 116-122. The management component 128 may also base estimates on inputs from the user interfaces 112-114 that indicate the purchase and setup of machines with larger work capacities.

The work completion times listed in the predicted cycle time column 220 and the projected cycle time column 222 may be subdivided into work completion times for work shifts of the staff 124-126 at the sites 102-104 and even the work completion times for each of the machines 116-122 at the sites 102-104. By comparing these subdivided work completion times that are estimated times in the predicted cycle time column 220 and actual times in the projected cycle time column 222, the management component 128 may evaluate lead staff work completion time estimations and/or staff work speed. For example, if a work shift under a supervisor consistently processes work in less time than the management component 128 estimates for the work shift, the supervisor and the work shift may earn bonuses. In another example, if a work shift under a supervisor consistently processes work in more time than the management component 128 estimates for the work shift, the supervisor may need to be trained to properly enter data for the work shift. Although the values in FIG. 2 are based on pieces allocated to the sites 102-104 collectively and estimated processing time for the sites 102-104 collectively, the table 200 may depict each of the values for each of the sites 102-104 collectively and individually, and by each individual machine at the sites 102-104.

FIG. 3 shows a table 300 for workload management for printing and inserting mail according to some embodiments of the present disclosure. The table 300 includes a cycle column 302, a total small column 304, a $1^{st}$ site small column 306, a $2^{nd}$ site small column 308, a $2^{nd}$ site medium column 310, a total large column 312, a $1^{st}$ site large column 314, a $2^{nd}$ site large column 316, a total jumbo column 318, a $1^{st}$ site jumbo column 320, a $2^{nd}$ site jumbo column 322, and rows 324 corresponding to the columns 302-322. The table 300 also includes volumes sub-tables 326, such as a medium sub-table 328, a large sub-table 330, and a jumbo sub-table 332. The cycle column 302 identifies the work cycle number, which may denote a calendar date number or a sequence in which work files are received from a billing application. The total small column 304, the $1^{st}$ site small column 306, and the $2^{nd}$ site small column 308 indicate the total amount of small size invoices for each cycle and the amount of small size invoices that each of the sites 102-104 is initially allocated for each cycle. The $2^{nd}$ site medium column 310 indicates both the total amount of medium size invoices for each cycle and the amount of invoices that the second site 104 is initially allocated each cycle because in this example the first site 102 does not process any medium size invoices. The total large column 312, the $1^{st}$ site large column 314, and the $2^{nd}$ site large column 316 indicate the total amount of large size invoices for each cycle and the amount of large size invoices that each of the sites 102-104 is initially allocated for each cycle. The total jumbo column 318, the $1^{st}$ site jumbo column 320, and the $2^{nd}$ site jumbo column 322 indicate the total amount of jumbo size invoices for each cycle and the amount of jumbo size invoices that each of the sites 102-104 is initially allocated for each cycle.

The medium sub-table 328 indicates how the small size invoices are initially allocated to the sites 102-104 based on the number of medium size invoices that are initially allocated. The first site 102 has the capability to process the small size invoices, but not to process the medium size invoices. The second site 104 has the capability to process both medium size invoices and the small size invoices, and the medium size invoice inserters have the capability to process both medium and small size invoices. Therefore, if the number of the medium size invoices that the second site 104 is initially allocated is increased, the number of the small size invoices that the second site 104 is initially allocated is decreased, which means the number of the small size invoices initially allocated to the first site 102 is initially increased. For example, the medium sub-table 328 indicates that if the medium size invoices initially allocated to the second site 104 increase from the range of 0 to 21 thousand to the range of 58 to 68 thousand, the percentage of the total small size invoices initially allocated to the second site 104 decreases from 35% to 24%. The table 300 reflects the distribution of small size invoices indicated in the medium sub-table 328. For example, when the second site 104 is initially allocated 7,441 medium size invoices in the $2^{nd}$ cycle, the second site 104 is initially allocated 144,594 small size invoices, which equals 35% of the 413,125 total small size invoices initially allocated for the $2^{nd}$ cycle. In another example, when the second site 104 is initially allocated 60,992 medium size invoices in the $3^{rd}$ cycle, the second site 104 is initially allocated 140,409 small size invoices, which equals 24% of the 585,036 total small size invoices initially allocated for the $3^{rd}$ cycle.

The large sub-table 328 indicates how the large size invoices are initially allocated to the sites 102-104. For example, when the total number of large size invoices is in the range from 42 to 58 thousand invoices, the first site 102 is initially allocated 41% of the large size invoices and the second site 104 is initially allocated 59% of the large size invoices. Continuing this example, the first site 102 is initially allocated 17,789 large size invoices during the $3^{rd}$ cycle, which is 41% of the 43,388 total large size invoices initially allocated for the $3^{rd}$ cycle. When the management component 128 allocates the work between the sites 102-104, the management component 128 may take into account the zip codes for the invoices to enable the sites to receive bulk mail postage discounts. For example, instead of randomly selecting the 41% of the large size invoices to initially allocate to the first site 102, the management component 128 bundles together as many of the large size invoices that have the same 5 digit zip code and as many of the large size invoices that have the same first 3 digits in their zip codes, and initially allocates each complete bundle to either the first site 102 or the second site 104. If the management component 128 allocates a different distribution of work to the sites 102-104 based on comparing the estimated work completion times to the service level agreement 132, the management component 128 takes the zip code bundles into account to preserve available postage discounts. Alternatively, the billing application that provides the work files to the management component 128 may sort and bundle the invoices based on zip codes when creating the work files.

The jumbo sub-table 328 indicates how the jumbo size invoices are initially allocated to the sites 102-104. For example, when the total number of jumbo size invoices is more than 800, the first site 102 is initially allocated 50% of the jumbo invoices and the second site 104 is initially allocated 50% of the jumbo size invoices. Continuing this example, the first site 102 is initially allocated 446 jumbo size invoices during the $3^{rd}$ cycle, which is 50% of the 892 total jumbo size invoices initially allocated for the $3^{rd}$ cycle.

The initial allocations of work reflected in table 300 may be approved or revised by the management component 128. While the initial allocation of work may be based on the allocation of work during a previous month's cycles, the management component 128 outputs an allocation of work to the process servers 108-110 based on the comparison of the estimated work completion times for the cycles to the work completion times specified in the service level agreement 132. For example, after initially allocating 24% of the small size invoices to the second site 104 during the $23^{rd}$ cycle, the management component 128 reschedules the preventative maintenance for one of the small size invoice inserters at the second site 104 from the $25^{th}$ cycle to the $23^{rd}$ cycle. Therefore, the management component 128 allocates the work previously allocated for the small invoice inserter assigned for preventative maintenance during the $23^{rd}$ cycle to the other three small invoice inserters at the second site 104 and the six small invoice inserters at the first site 102 that are scheduled to operate during the $23^{rd}$ cycle.

Figure 4:
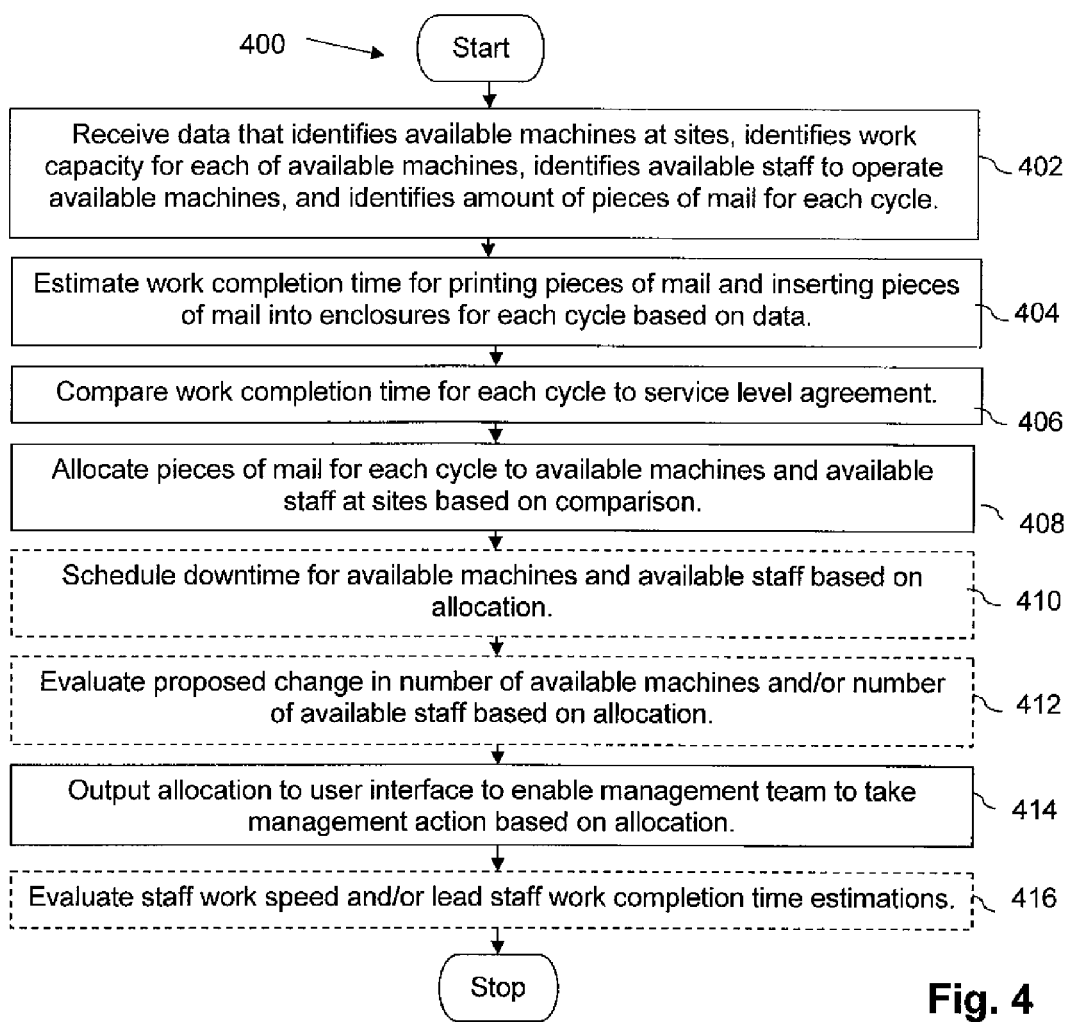
FIG. 4 is a flowchart for method for workload management for printing and inserting mail according to some embodiments of the present disclosure.

FIG. 4 shows a flowchart of a method 400 for workload management for printing and inserting mail according to some embodiments of the present disclosure. The system 100 can execute the method 400 to allocate work for each work cycle to available machines and available staff at multiple sites based on a comparison of estimated work completion times to work completion times specified in a service level agreement.

In box 402, data is received that identifies available machines at sites, identifies work capacity for each of the available machines, identifies available staff to operate the available machines, and identifies an amount of pieces of mail for each cycle in a month. For example, the management component 128 receives data that identifies 10 of the staff 124-126 to operate 20 of the machines 116-122 at the sites 102-104 for the $1^{st}$ cycle, 601,028 invoices to process during the first cycle, and the capacity to process 44, 712 large invoices in a 24 hour period.

In box 404, a work completion time is estimated for each cycle based on the data. For example, the management component 128 estimates a work completion time of 31 hours, 6 minutes, and 30 second for the $1^{st}$ cycle based on the data.

In box 406, the estimated work completion time for each cycle is compared to a service level agreement. For example, the management component 128 compares the estimated work completion time of 31 hours, 6 minutes, and 30 second for the $1^{st}$ cycle to the service level agreement 132.

In box 408, the pieces of mail for each cycle are allocated to the available machines and the available staff at the sites based on the comparison. For example, the management component 128 allocates a jumbo size invoice inserter to be converted to a large size invoice inserter for a cycle based on the comparison that indicates that processing the larger size invoices may take too much time for the cycle.

In box 410, downtime for the available machines and the available staff is optionally scheduled based on the allocation. For example, the management component 128 reschedules the preventative maintenance for one of the small size invoice inserters at the second site 104 from the $25^{th}$ cycle to the $23^{rd}$ cycle.

In box 412, a proposed change in the number of the available machines and/or the number of the available staff is optionally evaluated based on the allocation. For example, the management component 128 recommends the purchase of a new large size invoice inserter and the hire of a new staff member.

In box 414, the allocation is output to the user interface to enable a management team to take a management action based on the allocation. For example, the management component 128 outputs the allocation and the recommendation to purchase a new large size invoice inserter to the second user interface 114 via the second process server 110, which enables the management team at the second site 104 to approve the rescheduled preventative maintenance, and to approve the purchase of the new large size invoice inserter and the hire of the new staff member. Other examples of management actions include revising a scheduled preventative maintenance, decommissioning one of the machines 116-122 that is no longer working at a high capacity, laying off one of the staff 124-126 that is not working efficiently, and deferring vacation time for the staff 124-126.

In box 416, staff work speed and/or lead staff work completion time estimations are optionally evaluated. For example, the management component 128 determines that a supervisor and the supervisor's work shift have earned bonuses because the supervisor's work shift consistently processes work in less time than the management component 128 estimates for the work shift.

Figure 5:
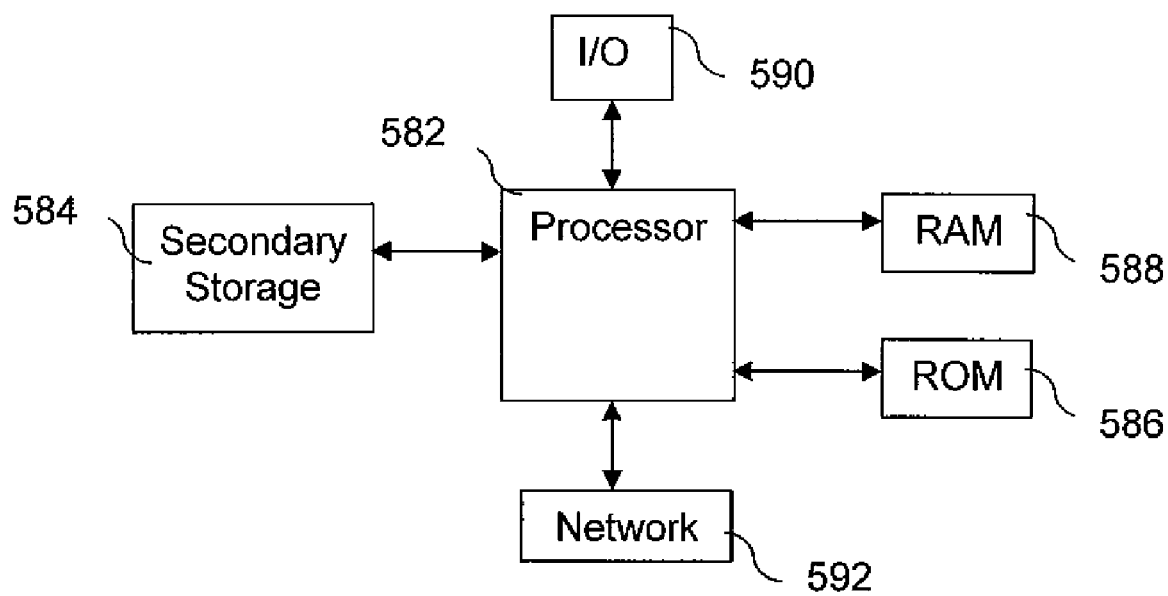
FIG. 5 illustrates an exemplary general purpose computer system suitable for implementing embodiments of the disclosure.

Some aspects of the system described above may be implemented on any general-purpose computer with sufficient processing power, memory resources, and network throughput capability to handle the necessary workload placed upon it. FIG. 5 illustrates a typical, general-purpose computer system suitable for implementing one or more embodiments disclosed herein. The computer system 580 includes a processor 582 (which may be referred to as a central processor unit or CPU) that is in communication with memory devices including secondary storage 584, read only memory (ROM) 586, random access memory (RAM) 588, input/output (I/O) devices 590, and network connectivity devices 592. The processor 582 may be implemented as one or more CPU chips.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are read during program execution. ROM 586 is a non-volatile memory device which typically has a small memory capacity relative to the larger memory capacity of secondary storage 584. The RAM 588 is used to store volatile data and perhaps to store instructions. Access to both ROM 586 and RAM 588 is typically faster than to secondary storage 584.

I/O devices 590 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 592 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 592 may enable the processor 582 to communicate with an Internet or one or more intranets. With such a network connection, it is contemplated that the processor 582 might receive information from the network, or might output information to the network in the course of performing the above-described method steps. Such information, which is often represented as a sequence of instructions to be executed using processor 582, may be received from and outputted to the network, for example, in the form of a computer data signal embodied in a carrier wave.

Such information, which may include data or instructions to be executed using processor 582 for example, may be received from and outputted to the network, for example, in the form of a computer data baseband signal or signal embodied in a carrier wave. The baseband signal or signal embodied in the carrier wave generated by the network connectivity devices 592 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 582 executes instructions, codes, computer programs, scripts which it accesses from hard disk, floppy disk, optical disk (these various disk based systems may all be considered secondary storage 584), ROM 586, RAM 588, or the network connectivity devices 592. While only one processor 582 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for workload management of printing and inserting mail, comprising:
    a user interface;
    a processor; and
    a management component, when executed by the processor, to receive data that identifies available machines at a plurality of sites, identifies a work capacity for each of the available machines, identifies available staff to operate the available machines, and identifies an amount of pieces of mail for each of a plurality of cycles in a month, wherein the pieces of mail comprise invoices,
        to estimate a work completion time for printing the pieces of mail and inserting the pieces of mail into enclosures for each of the plurality of cycles based on the data, to compare the estimated work completion time for each of the plurality of cycles to a service level agreement,
        to allocate the pieces of mail for each of the plurality of cycles to the available machines and the available staff at the plurality of sites based on the comparison,
        to schedule downtime for the available machines and the available staff based on the allocation, and
        to output the allocation and the scheduled downtime to the user interface to enable a management team to take a management action based on at least one of the allocation and the scheduled downtime.

2. The system of claim 1, wherein the available machines comprise at least one of invoice printing machines and invoice inserting machines.

3. The system of claim 2, wherein the amount of pieces of mail for each of the plurality of cycles is allocated to at least one of the invoice printing machines and the invoice inserting machines based on an invoice enclosure size that comprises at least one of a small invoice enclosure, a medium invoice enclosure, a large invoice enclosure, and a jumbo invoice enclosure.

4. The system of claim 1, wherein a portion of the available staff are trained to operate a first portion of the available machines but not trained to operate a second portion of the available machines.

5. The system of claim 1, wherein the work capacity for each of the available machines is based on an average of a predetermined number of greatest throughput cycles for each of the available machines.

6. The system of claim 1, wherein the amount of work for each of the plurality of cycles is based on a previous month of cycles.

7. The system of claim 1, wherein the downtime comprises at least one of scheduled maintenance for at least one of the available machines, a staff meeting for at least some of the available staff, and time off from work for at least some of the available staff.

8. The system of claim 1, wherein the management action comprises at least one of approving at least one of the allocation and the scheduled downtime and modifying at least one of the allocation and the scheduled downtime.

9. A computer implemented method for workload management for printing and inserting mail, comprising:
  receiving, by a management component stored on a non-transitory computer medium and executable by a processor, data that identifies available machines at a plurality of sites, identifies a work capacity for each of the available machines, identifies available staff to operate the available machines, and identifies an amount of pieces of mail for each of a plurality of cycles in a month, wherein the pieces of mail comprise invoices;
  estimating, by the management component, a work completion time for printing the pieces of mail and inserting the pieces of mail into enclosures for each of the plurality of cycles based on the data;
  comparing, by the management component, the estimated work completion time for each of the plurality of cycles to a service level agreement;
  allocating, by the management component, the pieces of mail for each of the plurality of cycles to the available machines and the available staff at the plurality of sites based on the comparison;
  evaluating, by the management component, a proposed change in at least one of a number of the available machines and a number of the available staff based on the allocation; and
  outputting, by the management component, the allocation and the evaluation to a user interface to enable a management team to take a management action based on at least one of the allocation and the evaluation.

10. The computer implemented method of claim 9, wherein estimating the work completion time for each of the plurality of cycles based on the data comprises estimating an average work completion time for the plurality of cycles.

11. The computer implemented method of claim 10, wherein the average work completion time for the plurality of cycles is based on a combination of an actual work completion time for at least one of the plurality of cycles and the work completion time for a remaining number of the plurality of cycles.

12. The computer implemented method of claim 10, wherein allocating the pieces of mail for each of the plurality of cycles to the available machines and the available staff at the plurality of sites is based on the average work completion time for the plurality of cycles.

13. The computer implemented method of claim 9, wherein allocating the pieces of mail for each of the plurality of cycles to the available machines and the available staff at the plurality of sites is based on allocating a first portion of one type of work to one of the plurality of sites and allocating a second portion of the one type of work to another of the plurality of sites.

14. The computer implemented method of claim 9, wherein allocating the pieces of mail for each of the plurality of cycles to the available machines and the available staff at the plurality of sites is based on at least one of work that cannot be shared between all of the plurality of the sites and zip codes that are associated with the work.

15. The computer implemented method of claim 9, wherein allocating the pieces of mail for each of the plurality of cycles to the available machines and the available staff at the plurality of sites is based on completing work for a first cycle prior to beginning work for a second cycle.

16. The computer implemented method of claim 9, wherein allocating the pieces of mail for each of the plurality of cycles to the available machines and the available staff at the plurality of sites comprises at least one of allocating the pieces of mail for each of the plurality of cycles from one of the available machines at one of the plurality of sites to another of the available machines at the one of the plurality of sites and allocating the pieces of mail for each of the plurality of cycles from one of the available machines at one of the plurality of sites to another of the available machines at another of the plurality of sites.

17. The computer implemented method of claim 9, wherein the proposed change in at least one of the number of the available machines and the number of the available staff is a proposed long-term change based on at least one of increasing a number of machines, increasing a number of staff, decreasing a number of machines, and decreasing a number of staff.

18. The computer implemented method of claim 9, further comprising evaluating at least one of staff work speed and lead staff work completion time estimations.

19. A system for workload management for printing and inserting mail, comprising:
  a user interface;
  a processor; and
  a management component, when executed by the processor, to receive data that identifies available machines at a plurality of sites, identifies a work capacity for each of the available machines, identifies available staff to operate the available machines, identifies an amount of pieces of mail for each of a plurality of cycles in a month, and identifies a cost associated with at least one of each of the available machines, each of the available staff, and the amount of pieces of mail, wherein the pieces of mail comprise invoices,
    to estimate a work completion time for printing the pieces of mail and inserting the pieces of mail into enclosures for each of the plurality of cycles based on the data,
    to compare the estimated work completion time for each of the plurality of cycles to a service level agreement,
    to allocate the pieces of mail for each of the plurality of cycles to the available machines and the available staff at the plurality of sites based on the comparison and the cost associated with at least one of each of the available machines, each of the available staff, and the amount of work, and
    to output the allocation to the user interface to enable a management team to take a management action based on the allocation.

20. The system of claim 19, wherein the cost associated with at least one of each of the available machines, each of the available staff, and the pieces of mail comprises at least one of postage costs and maintenance costs for each of the available machines.

* * * * *